(12) United States Patent
Katsumata et al.

(10) Patent No.: US 6,624,931 B2
(45) Date of Patent: Sep. 23, 2003

(54) MICROSCOPE SYSTEM, OPERATION CONTROL METHOD AND PROGRAM FOR MICROSCOPE SYSTEM

(75) Inventors: Masaya Katsumata, Sagamihara (JP); Yasuko Nakazato, Tama (JP); Kiyoshi Yuri, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/904,958

(22) Filed: Jul. 13, 2001

(65) Prior Publication Data

US 2002/0053639 A1 May 9, 2002

(30) Foreign Application Priority Data

Jul. 14, 2000 (JP) ........................................ 2000-214679

(51) Int. Cl.[7] .............................................. G02B 21/00
(52) U.S. Cl. ....................... 359/368; 359/363; 359/381; 359/388
(58) Field of Search .................. 359/363, 368, 359/369, 381, 385, 388; 348/79

(56) References Cited

U.S. PATENT DOCUMENTS

| | | | | |
|---|---|---|---|---|
| 4,887,892 A | * | 12/1989 | Bacus | 348/131 |
| 5,073,857 A | * | 12/1991 | Peters et al. | 348/138 |
| 5,712,725 A | * | 1/1998 | Faltermeier et al. | 345/164 |
| 5,946,131 A | * | 8/1999 | Wells et al. | 348/79 |
| 6,148,096 A | * | 11/2000 | Pressman et al. | 348/79 |
| 6,313,452 B1 | * | 11/2001 | Paragano et al. | 250/201.3 |

FOREIGN PATENT DOCUMENTS

| | | |
|---|---|---|
| JP | 07-104188 | 4/1995 |
| WO | WO 96/18924 | 6/1996 |

* cited by examiner

Primary Examiner—Mark A. Robinson
(74) Attorney, Agent, or Firm—Frishauf, Holtz, Goodman & Chick, P.C.

(57) ABSTRACT

A microscope body has at least one observation unit and is capable of being operated by respective controller corresponding to this observation unit. An operation unit determines the operation instruction for the respective controller. An operation switch detecting unit detects an operation of the operation unit and informs the detected operation to the exterior of the microscope body. An outer control device has a storage unit, in which first operational instructing information for the respective controller is registered, and identifies the operational instructing information corresponding to a detected result from the operation switch detecting unit with reference to the storage unit. An observation unit control section converts the operational instructing information which is identified by the outer control device, into operation instructing commands for the observation unit and gives the operation instructing commands to the respective controller.

8 Claims, 14 Drawing Sheets

File name test function setting data.txt

| Button No. | Cube | Objective lens | Shutter | Filter1 | AF | Incident/ transmissive illumination | Lamp voltage | Computer power source | Software cooperation | Switch setting data | Illumination | Central power supply | Laser light beam | Digital camera |
|---|---|---|---|---|---|---|---|---|---|---|---|---|---|---|
| 1 | CUBU A | OB C | OFF | FL6 | ON | Incident | 0.0 | X | | X | X | X | X | X |
| 2 | X | X | X | X | X | Transmissive | X | X | | | X | X | X | X |
| 3 | CUBU D | OB A | ON | X | ON | Incident | 0.0 | X | | X | X | X | X | X |
| 4 | NONE | OB D | X | X | X | X | X | X | | X | X | X | X | X |
| 5 | X | X | X | X | X | X | X | X | Soft 1.2 | File 02 | | | X | X |
| 6 | X | X | X | X | X | X | X | Power supply off | | | | | | |
| 7 | X | X | X | X | X | X | X | | | X | off | off | off | Photography |

FIG. 8

MICROSCOPE SYSTEM, OPERATION CONTROL METHOD AND PROGRAM FOR MICROSCOPE SYSTEM

CROSS REFERENCE TO RELATED APPLICATIONS

This application is based upon and claims the benefit of priority from the prior Japanese Patent Application No. 2000-214679, filed Jul. 14, 2000, the entire contents of which are incorporated herein by reference.

BACKGROUND OF THE INVENTION

The present invention relates to a microscope system capable of setting various observation conditions, an operation control method and an operation control program for the microscope system.

The microscope system is used in many fields including a biological field and an inspection step of a technical field to enlarge and observe a minute sample or record an observation image as a photograph and a video image.

According to such a microscope system, in the case of taking a photograph for recording the observation image or observing the sample on television, a photographic light path, to which a photographic apparatus is fit, is selected as well as a correcting filter and a light decreasing filter for setting observation conditions for adjusting brightness and colors or the like are operated depending on the photographic condition of the photographic apparatus and the preference of a user. These observation conditions are variously set and the setting conditions are different depending on the observers.

However, according to such a microscope system, a function and a position of an operational switch or the like for receiving the operation instruction with respect to these photographic conditions and the observation conditions are fixed. Further, the operation is carried out by a single function. Additionally, as a function of the microscope system is fulfilled, the number of the operational switches is increased. Therefore, this involves a problem such that the operation becomes complicated for the observer and it takes a long time to be familiar with the operation or the like, so that there was a tendency to overload the observer.

In order to solve the above problem, as discussed in Jpn. Pat. Appln. KOKAI Publication No. 7-104188 and Jpn. Pat. Appln. No. 6-311858, conventionally, a microscope system capable of converting or changing a function and a position of an operational switch depending on the observer has been considered. FIG. 17 illustrates a schematic structure of such a microscope system. In FIG. 17, a microscope body 100 has operational switches 101*a*, 101*b* and 101*c*. If these operational switches 101*a*, 101*b* and 101*c* are pressed down, an operational signal is transmitted to an interface unit 102. Then, a microscope control unit carries out an operation of the microscope body 100 by the use of function setting data which is registered in the interface unit 102 in advance by the observer.

However, the microscope control unit is normally formed by a firmware, so that an address space is small and a development environment is not sufficient. Therefore, after the microscope system is delivered, if the observer requests enlargement of a function and a complicated cooperative operation and the function setting data is largely changed, the microscope control unit is not capable of coping with this situation. In this case, there was a problem such that it took a long time to create another version of a ROM or the like for each change, so that it became difficult to quickly response to the operator's request.

Alternatively, in the case of setting and changing the function setting data, the microscope control unit does not have a function to operate the microscope from the operational switches 101*a*, 101*b* and 101*c*, so that the microscope should be operated from inputting means for the microscope control unit. Therefore, this involved a problem such that the setting of the inspection conditions became complicated depending on the observer's usage purpose and the microscope was needed to be driven every when these operations were carried out, so that the operability of the microscope became deteriorated.

The present invention has been made taking the problems into consideration, an object of which is to provide a microscope system capable of improving the operability of the system, an operation control method and an operation control program for the microscope system.

BRIEF SUMMARY OF THE INVENTION

In order to attain the above described purpose, a first aspect of the present invention comprises a microscope system comprising:

a microscope body having at least one observation unit and capable of being operated by respective controller corresponding to the observation unit;

an operation unit for determining the operation instruction to the respective controller;

an operation switch detecting unit for detecting an operation of the operation unit and informing the detected operation to the exterior of the microscope body;

an outer control device having a storage unit, in which first operational instructing information for the respective controller is registered, and identifying the operational instructing information corresponding to a detected result from the operation switch detecting unit with reference to the storage unit; and an observation unit control section for converting the operational instructing information which is identified by the outer control device, into operation instructing commands to the observation unit and giving the operation instructing commands to the respective controller.

Alternatively, a second aspect of the present invention comprises a microscope system comprising:

a microscope body having an observation unit and a photograph unit;

a microscope control unit for giving the operation instructions to the observation unit and the photograph unit of the microscope body;

a microscope image processing unit for processing the microscope image which is obtained by the photograph unit;

an operational instructing information registering unit for registering the operational instructing information corresponding to a message from the microscope image processing unit; and a control unit for receiving the message from the microscope image processing unit, reading out the corresponding to operational instructing information by the microscope control unit from the operational instructing information registering unit and instructing the observation unit and the photograph unit of the microscope body in the operation.

Additionally, a third aspect of the present invention comprises an operation control method of a microscope system; wherein the microscope system comprising:

a microscope body having at least one observation unit and capable of being operated by respective controller corresponding to the observation unit;

an operation unit for determining the operation instruction to the respective controller;

an operation switch detecting unit for detecting an operation of the operation unit and informing the detected operation to the exterior of the microscope body;

an outer control device having a storage unit, in which first operational instructing information for the respective controller is registered; and an observation unit control section for converting the information from the outer control device into operation instructing commands to the observation unit and giving the operation instructing commands to the respective controller;

wherein the operation control method of a microscope system comprising:

receiving a detection result from the operation switch detecting unit;

referring to the storage unit;

identifying the first operational instructing information corresponding to the detection result; and transmitting the identified information to the observation unit control section.

Further, a fourth aspect of the present invention comprises an operation control method of a microscope system having a microscope body comprising an observation unit and a photograph unit; wherein the microscope system comprising:

a microscope control unit for giving the operation instructions to the observation unit and the photograph unit of the microscope body;

a microscope image processing unit for processing the microscope image which is obtained by the photograph unit; and an operational instructing information registering unit for registering the operational instructing information corresponding to a message from the microscope image processing unit;

the microscope system receives the message from the microscope image processing unit, refers to the operational instructing information registering unit, identifies the operational instructing information corresponding to the message and transmits the identified operational instructing information in order to instruct the observation unit and the photograph unit of the microscope body in the operation.

Alternatively, a fifth aspect of the present invention comprises an operation control program of a microscope system; wherein the microscope system comprising:

a microscope body having at least one observation unit and capable of being operated by respective controller corresponding to the observation unit;

an operation unit for determining the operation instruction to the respective controller;

an operation switch detecting unit for detecting an operation of the operation unit and informing the detected operation to the exterior of the microscope body;

an outer control device having a storage unit, in which first operational instructing information for the respective controller is registered; and an observation unit control section for converting the information from the outer control device into operation instructing commands to the observation unit and giving the operation instructing commands to the respective controller;

wherein the operation control program of microscope system comprising: receiving a detection result from the operation switch detecting unit; refers to the storage unit, identifies the first operational instructing information corresponding to the detection result and transmits the identified information to the observation unit control section.

Alternatively, a sixth aspect of the present invention comprises an operation control program of a microscope system having a microscope body comprising an observation unit and a photograph unit; wherein the microscope system comprising:

a microscope control unit for giving the operation instructions to the observation unit and the photograph unit of the microscope body;

a microscope image processing unit for processing the microscope image which is obtained by the photograph unit; and an operational instructing information registering unit for registering the operational instructing information corresponding to a message from the microscope image processing unit;

the microscope system receives the message from the microscope image processing unit, refers to the operational instructing information registering unit, identifies the operational instructing information corresponding to the message and transmits the identified operational instructing information in order to instruct the observation unit and the photograph unit of the microscope body in the operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 8 illustrates function setting data which is used in the first embodiment of the present invention;

DETAILED DESCRIPTION OF THE INVENTION

Reference will now be made in detail to the embodiments of the present invention with reference to the accompanying drawings below.

First Embodiment

Figure 1:
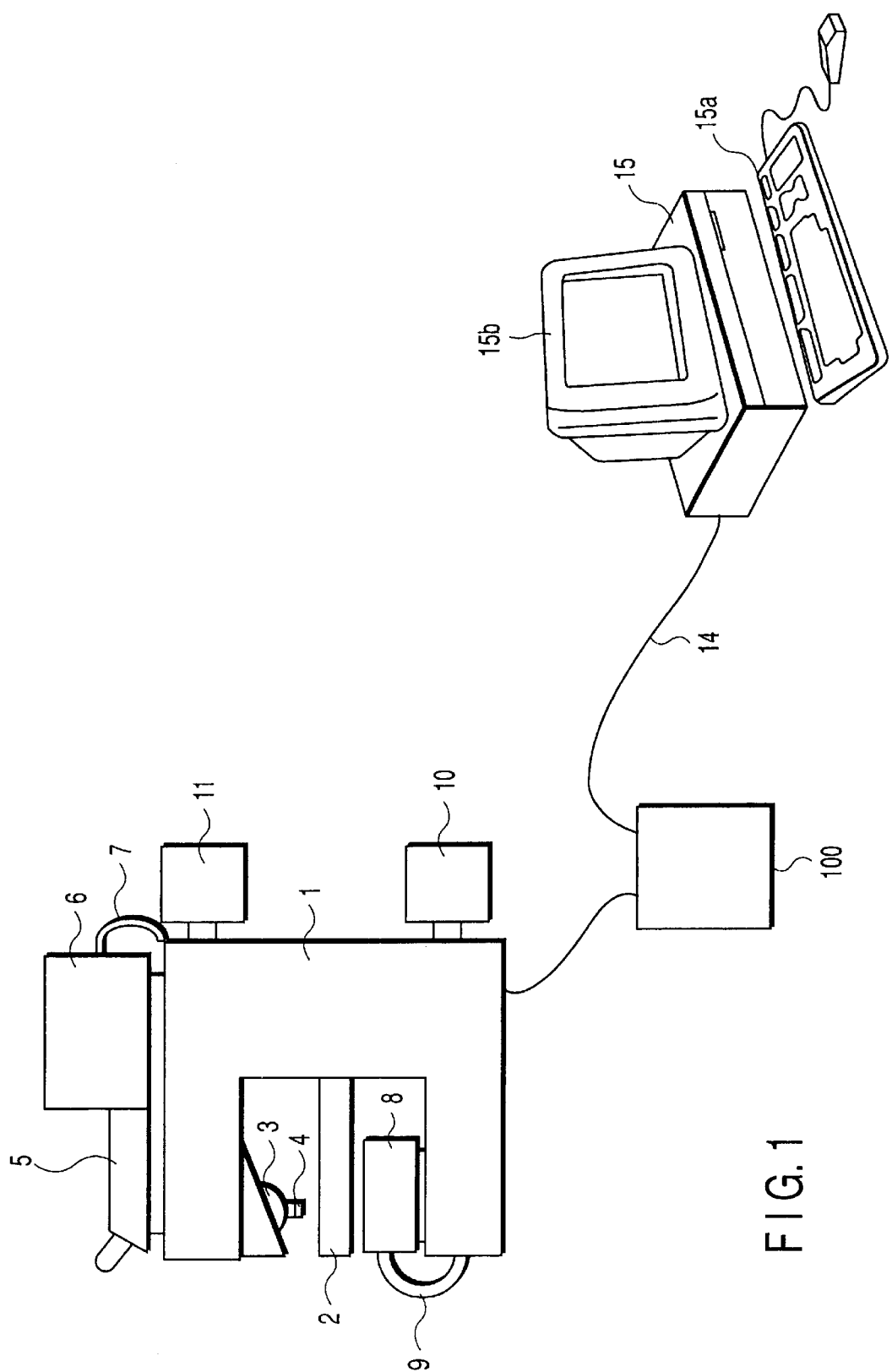
FIG. 1 illustrates a schematic structure of a microscope system according to a first embodiment of the present invention.

FIG. 1 illustrates a schematic structure of a microscope system according to a first embodiment of the present invention. In FIG. 1, a reference numeral 1 denotes a microscope body. In this microscope body 1, an objective lens 4 which is fit to a revolver 3, is arranged with being opposed to a sample on a sample stage 2. Additionally, on an observation light axis via this objective lens 4, an eyepiece tube unit 5 and a photograph unit 6 are arranged. This photograph unit 6 is connected to the microscope body 1 by a unit connection cable 7. Alternatively, below the sample stage 2, a condenser control unit 8 is arranged and this condenser control unit 8 is also connected to the microscope body 1 by an unit connection cable 9. On a rear surface of the microscope body 1, a lamp house 10 serving as a light source for transmissive illumination and a lamp house 11 serving as a light source for incident illumination are disposed.

The microscope body 1 is connected to an outer control device 15 such as a computer or the like via buses 39 and 14. Further, between the buses 39 and 14 and the outer control device 15, a universal control box (hereinafter, referred to as a UCB) 100 intervenes. The outer control device 15 has an input unit 15a such as a key board or the like and a display unit 15b such as a monitor or the like.

Figure 2:
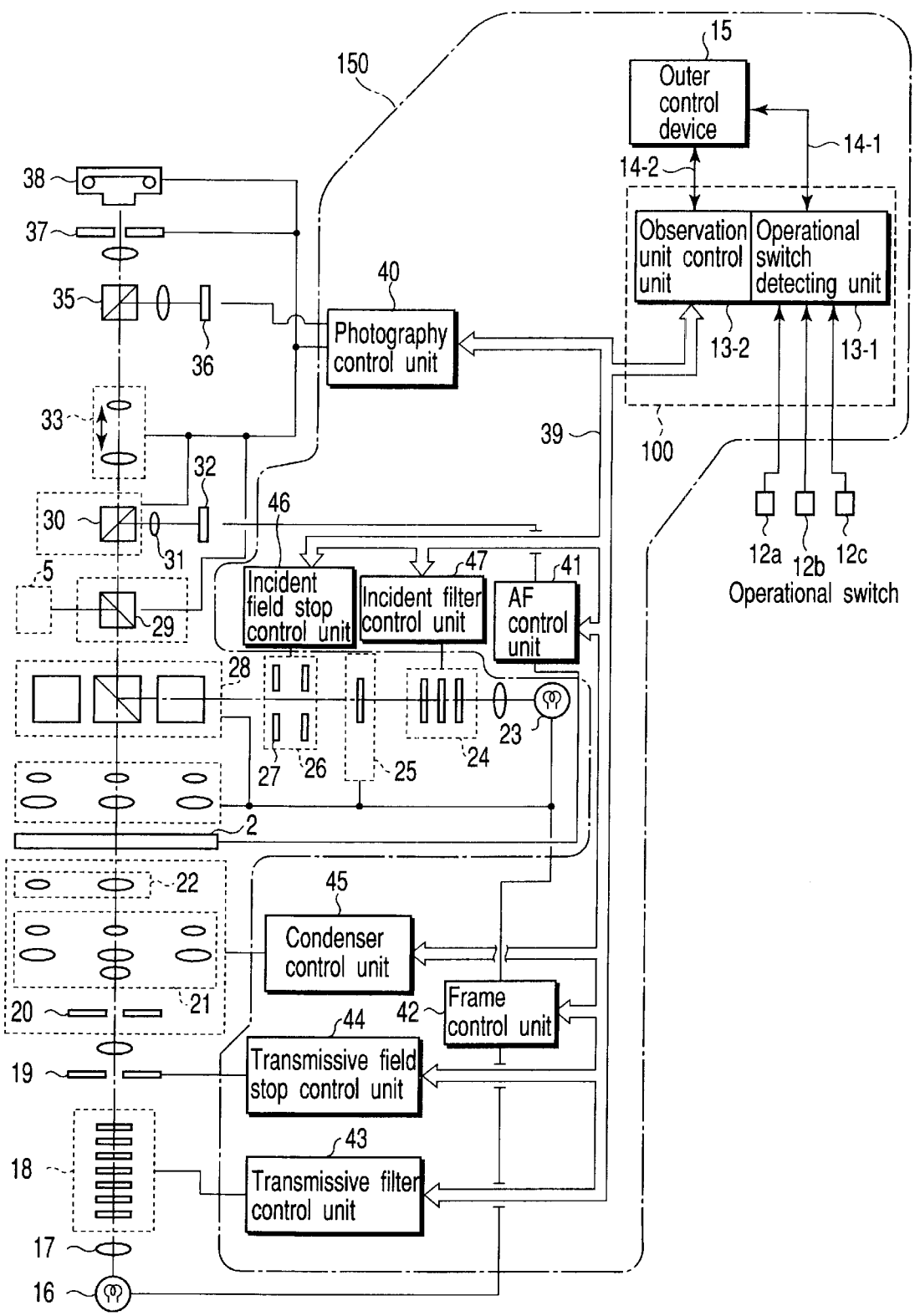
FIG. 2 illustrates a circuit structure of an entire microscope system according to a first embodiment of the present invention.
Figure 3:
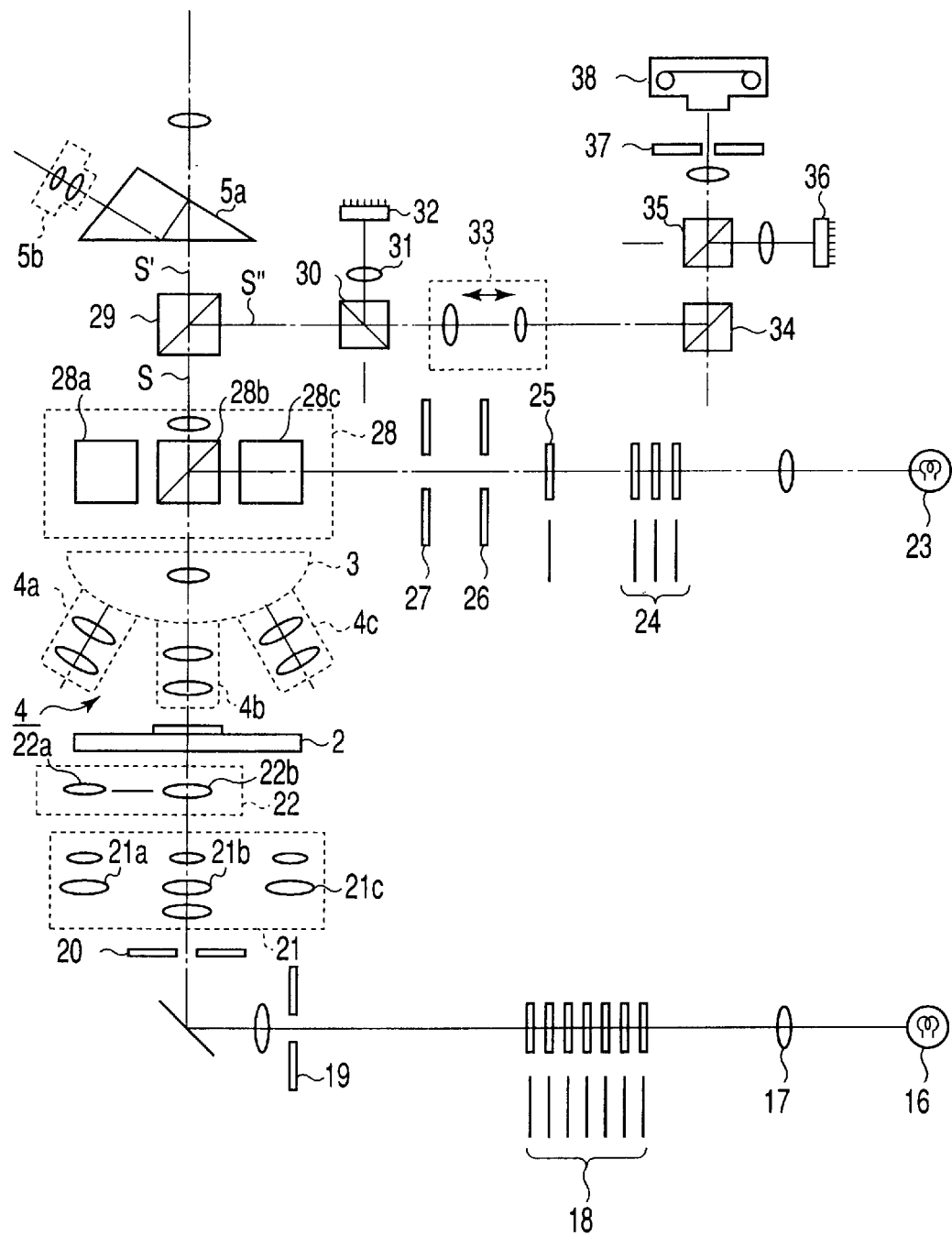
FIG. 3 illustrates a schematic structure of an optical system of the microscope system according to the first embodiment of the present invention.

FIG. 2 illustrates a circuit structure of entirety of such a microscope system and FIG. 3 particularly illustrates an optical system of the microscope system.

In this case, a light source 16 for transmissive illumination comprising a halogen lamp of an optical system for transmissive observation is provided. On a light path of transmissive illumination light which is radiated from this light source 16 for transmissive illumination, a collector lens 17 for collecting this transmissive illumination light, a transmissive filter unit 8, a transmissive field stop 19, a transmissive aperture stop 20, a condenser optical element unit 21 and a condenser top lens unit 22 are arranged so that the transmissive illumination light is irradiated from beneath the sample stage 2.

In this case, the transmissive filter unit 18 comprises a plurality of ND filters for regulating the brightness without changing a color temperature of the light source 16 for transmissive illumination and a plurality of correcting filters for correcting a color. The transmissive filter unit 18 enables any filter to be inserted in and released from the light path. The condenser optical element unit 21 has a plurality of condenser optical element units 21a to 21c to be inserted in the light path and the condenser top lens unit 22 also has a plurality of condenser top lens units 22a and 22b.

Alternatively, a light source 23 for incident illumination comprising a mercury lamp of an optical system for observing incident light. On a light path of incident illumination light which is radiated from this light source 23 for incident illumination, a filter unit for incident illumination 24, a shutter for incident illumination 25, an incident field stop 26 and an incident aperture stop 27 are arranged so that the incident illumination light is irradiated from above the sample stage 2 via a cube unit 28 and the objective lens 4 to be described later.

In this case, the filter unit 24 for incident illumination comprises a plurality of ND filters for regulating the brightness without changing a color temperature of the light source 23 for incident illumination and a plurality of correcting filters for correcting a color. The filter unit 24 for incident illumination enables any filter to be inserted in and released from the light path.

On an observation light path S, on which respective light axes of these optical system for transmissive light observation and an optical system for incident light observation, the cube unit 28 for switching dichroic mirrors 28a to 28c on the light path, the objective lens 4 and the sample stage 2 are arranged in response to a pilot microscopic inspection method. The objective lens 4 comprises a plurality of objective lenses 4a, 4b and 4c having different magnifications and these objective lenses 4a, 4b and 4c are fit to the revolver 3. Further, the objective lenses 4a, 4b and 4c are capable of being selectively inserted on the observation light path S by its rotation. The sample stage 2 is capable of two-dimensionally moving the sample within a flat surface which is orthogonal to the observation light path S, as well as it is capable of moving along a direction of the observation light path S in order to bring into focus.

On the observation light path S, a beam splitter 29 is arranged to branch the observation light path S into an observation light path S' and a photographic light path S". Then, on the observation light path S', the eyepiece tube unit 5 having a beam splitter 5a and an eyepiece lens 5b is arranged. Alternatively, the beam splitters 29 and 5a are capable of being inserted in and released from the light path.

On one hand, a beam splitter 30 is arranged on the photographic light path S" and a receiving element for detecting a focus 32 is arranged on one of the light paths branched by this beam splitter 30 via an imaging lens 31. This receiving element for detecting a focus 32 is used for measuring the light amount of the light for detecting a focus.

Alternatively, a beam splitter 34 is arranged on another one of the light paths branched by this beam splitter 30 via a zoom lens 33 for arbitrarily adjusting the photographic magnification. This beam splitter 34 is capable of being inserted in and released from the light path.

Additionally, on the light path which is reflected by the beam splitter 34, other beam splitter 35 is arranged. This beam splitter 35 is also capable of being inserted in and released from the light path. On one of the light paths which are branched by the beam splitter 35, a receiving element for photograph 36 is arranged. This receiving element for photograph 36 is used to measure the exposure time for taking a photograph. Alternatively, the light reflected by the beam splitter 34 enters a camera 38 storing a photographic film via a shatter for taking a photo 37 as the beam splitter 35 is released from the light path.

Next, a control system of a microscope system that is configured in this manner will be explained below. In this case, a dedicated serial bus 39 is connected to a photography control unit 40, an AF control unit 41 as control means for controlling various observation units to be described later, a frame control unit 42, a transmissive filter control unit 43, a transmissive field stop control unit 44, a condenser control unit 45, an incident field stop control unit 46, an incident filter control unit 47 and an observation unit control unit 13-2. This dedicated serial bus 39 may be a leased line (analog, digital) or may be a multi-purpose line such as RS232C (serial).

The photography control unit 40 drives and controls the beam splitters 29, 30 and 35 to be inserted in and released from the light path, drives and controls the zoom lens 33, performs the processing of the calculation of the photography time from a measured value of the receiving element for photograph 36, controls and drives of opening and closing of the shatter for taking a photo 37 and performs winding up and winding back of a film of the camera 38 or the like.

The AF control unit 41 carries out a predetermined addition of focal points by the data from the receiving element for detecting a focus 32. In response to this calculation result, the sample stage 2 is driven, so that the addition of the focal points is automatically performed.

The frame control unit 42 drives and controls the light source 16 for transmissive illumination, the polarity reversing circuit 23, the revolver 3, the cube unit 28 and the shutter for incident illumination 25.

The transmissive filter control unit 43 drives and controls the transmissive filter unit 18 and the transmissive field stop control unit 44 drives and controls the transmissive field stop 19.

The condenser control unit 45 drives and controls the condenser optical element unit 21 and the condenser top lens unit 22.

The incident field stop control unit 46 drives and controls the incident filed stop 26 and the incident aperture stop 27 and the incident filter control unit 47 drives and controls the incident filter unit 24.

The microscope body 1 is connected to a UCB 100 via the dedicated serial bus 39. This UCB 100 is connected to the outer control device 15 via the outer serial bus for input and output 14 (14-1 and 14-2).

The UCB 100 is provided with an operational switch detecting unit 13-1 and an observation unit control unit 13-2. The operational switch detecting unit 13-1 is connected to operational switches 12a to 12c. Alternatively, the operational switch detecting unit 13-1 is connected to the outer control device 15 via the outer serial bus for input and output 14-1. The observation unit control unit 13-2 is connected to respective control units via the dedicated serial bus 39 and it is connected to the outer control device 15 via the outer serial bus for input and output 14-2.

The operational switch detecting unit 13-1 has a function for detecting that the operational switches 12a to 12c are pressed down and operated and informing the outer control device 15 which switch is operated. The observation unit control unit 13-2 receives an operation instructing command from the outer control device 15 and transmits a driving signal with respect to the control units 40 to 47 of various operation units to the dedicated serial bus 39 in response to the received command. The transmitted driving signal is transmitted to respective control units 40 to 47 via the dedicated serial bus 39. Alternatively, the signal regarding the operational information from various control units 40 to 47 is also transmitted to the observation unit control section 13-2 via the dedicated serial bus 39.

For the simplified explanation, only three operational switches are illustrated here. However, if necessary, any number of the operational switches are capable of being provided. According to the present invention, it is assumed that seven operational switches are provided in association with FIG. 8 to be described later.

Alternatively, in place of the operational switch detecting unit 13-1 and the operational switches 12a, 12b and 12c, so called hand switch unit provided with the operational switches and incorporating the operation switch detecting function may be used and this hand switch unit may be connected to the microscope body 1 or the outer control device 15.

Figure 4:
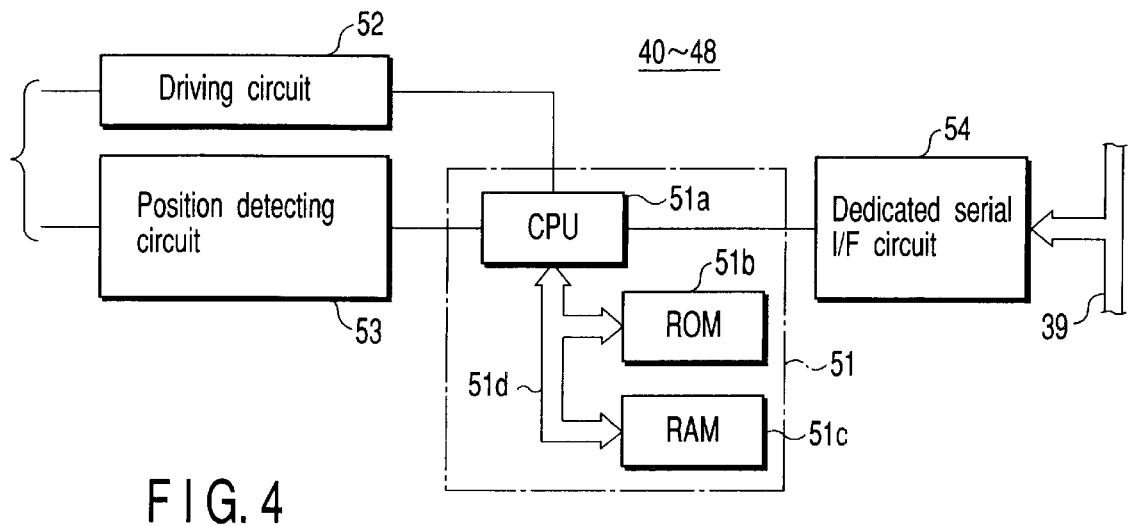
FIG. 4 illustrates a schematic structure of respective control units which are used in the first embodiment of the present invention.

FIG. 4 illustrates a specific circuit structure of respective control units 40 to 47 which are described above. In this case, a structure in FIG. 4 has a CPU circuit 51, a driving circuit 52 for driving an optical unit as an object to be controlled by the instruction from this CPU circuit 51, a position detecting circuit 53 for detecting a position of an object to be controlled and informing the CPU circuit 51 of this position, a dedicated serial I/F circuit 54 for connecting the CPU circuit 51 and the dedicated serial bus 39 and other unillustrated circuits. Alternatively, in the CPU circuit 51, a CPU 51a, a ROM 51b and a RAM 51c are connected by a CPU bus 51d, a program in which respective control contents are described is stored in the ROM 51b and the data for performing the control calculation is stored in the RAM 51c.

Then, the control instruction is sent to these control units 40 to 47 from the observation unit control unit 13-2 via the dedicated serial bus 39 and the CPU 51a is operated in accordance with the program of the ROM 51b, so that the control of respective optical units in charge are performed.

Figure 5:
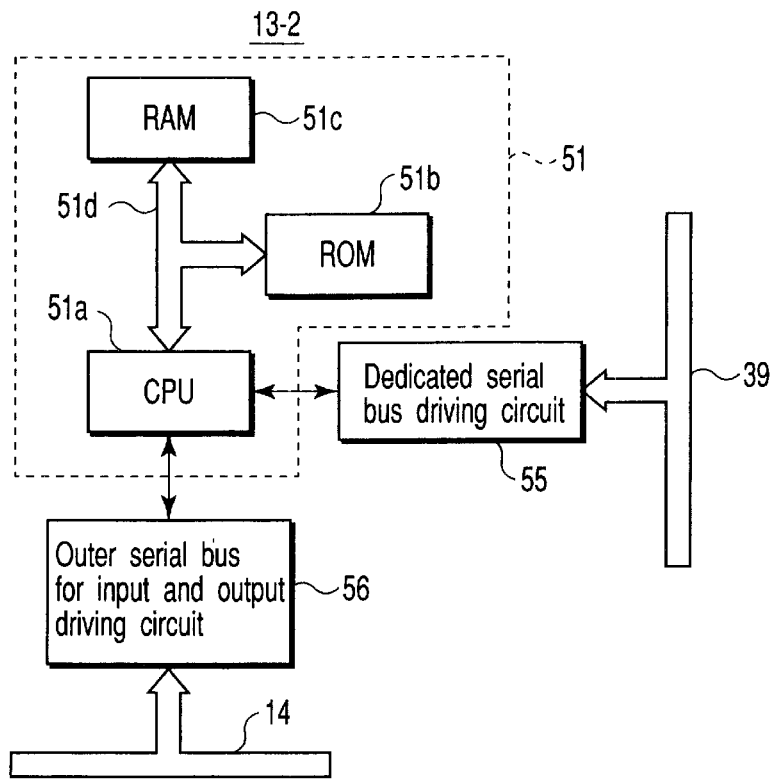
FIG. 5 illustrates a schematic structure of an observation unit control section 13-2 which is used in the first embodiment of the present invention.

FIG. 5 illustrates a schematic structure of the observation unit control unit 13-2.

In this case, this structure has a CPU circuit 51 which is the same as the above described CPU circuit 51, a dedicated serial bus driving circuit 55 for controlling the dedicated serial bus 39 and an outer serial bus for input and output driving circuit 56 for controlling the outer serial bus for input and output 14.

Figure 6:
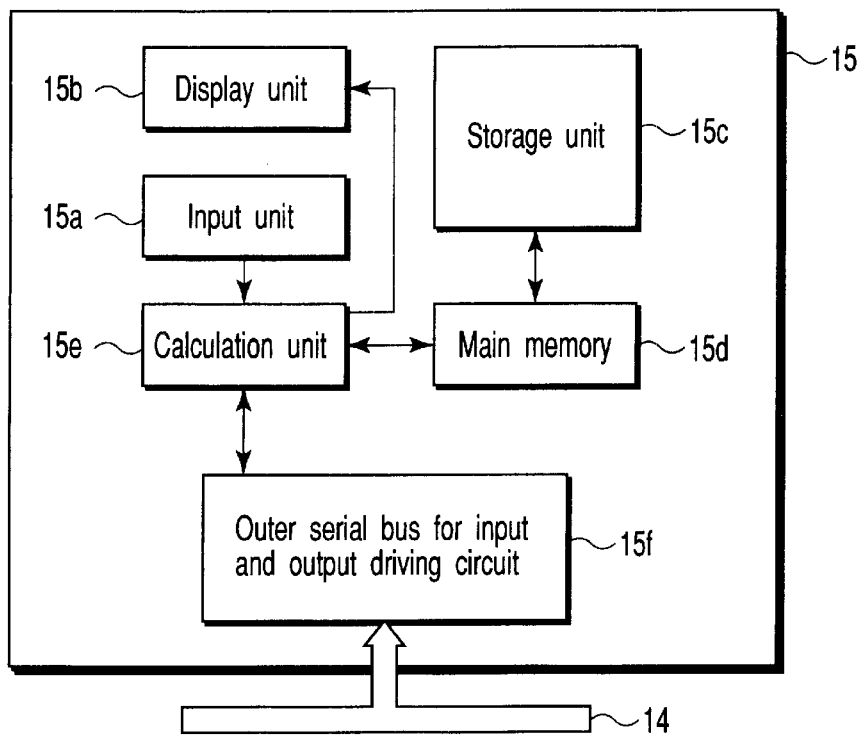
FIG. 6 illustrates a schematic structure of an outer control device which is used in the first embodiment of the present invention.

FIG. 6 illustrates a schematic structure of the outer control device 15.

In this case, the structure in FIG. 6 has a storage unit 15c, a main memory 15d, a calculation unit 15e and an outer serial bus for input and output driving circuit 15f in addition to the input unit 15a and the display unit 15b. The storage unit 15c judges the registration of the function setting data and the switching function and stores the control program for issuing the operation instruction and the function setting data as shown in FIG. 8. A recording medium such as a MO, a hard disk and a floppy disk or the like is used as the storage unit 15c. In this case, the function setting data has the information of respective operation instructions to the above described control units 40 to 47 as a function for operating the microscope body 1 as well as the function setting data has the partial information for operating the outer control device 15. In order to set these function setting data, the input unit 15a sets the input of the function items which are required by the operator, by using a software for analyzing the operation of the microscope body 1 by the outer control device 15 and instructing the operator, so that the operation instruction command for each function item is registered as data such as an alignment or the like. In this case, with respect to the switch numbers 1 to 4 corresponding to respective operational switches 12a, 12b and 12c, the operation instructing command for each function item is registered.

The control program recorded in the storage unit 15c is stored in the main memory 15d to be executed by the calculation unit 15e. Alternatively, the outer serial bus for input and output driving circuit 15f serves to control the outer serial bus for input and output 14. The input unit 15a serves to input various data such as the function setting data or the like. The display unit 15b displays various information.

Then, the operation of the microscope system which is configured in this manner, will be explained below.

Figure 7:
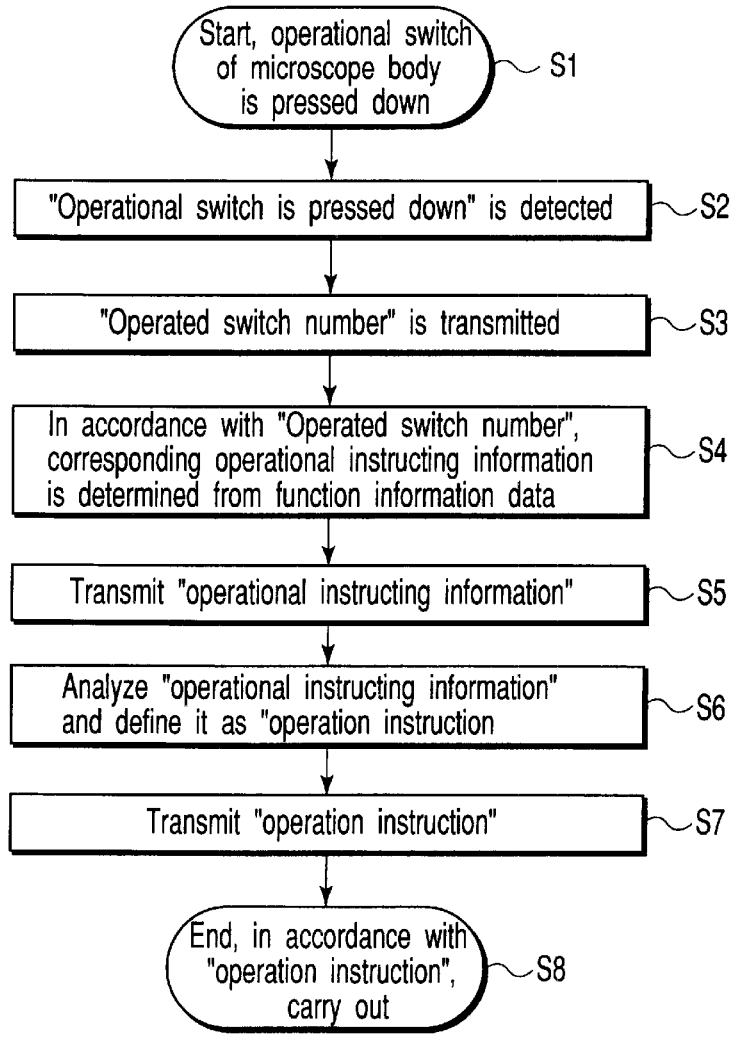
FIG. 7 is a flow chart for explaining the operation of the first embodiment of the present invention.

At first, the processing for operating the microscope body 1 will be explained in accordance with a flow chart shown in FIG. 7. In this case, at a starting point of step S1, if any one of the operational switches 12a, 12b and 12c are pressed down, the processing will be commenced. Next, in step S2, the operational switch detecting unit 13-1 recognizes which of the operational switches 12a, 12b and 12c is pressed down. In step S3, the detected content (i.e., the switch number) is transmitted to the main memory 15d of the outer control unit 15. Then, in step S4, referring to the function setting data shown in FIG. 8, in which the operational instructing information of the microscope body 1 is registered in advance, by the storage unit 15c, the operational instructing information for showing the operation of the microscope body 1 in association with the operational switch is 15 numbers which are transmitted in the step S3, is identified in the calculation unit 15e. Then, in step S5, the operational instructing information is transmitted to the observation unit control section 13-2 via the outer serial bus for input and output 14. In step S6, the operational instructing information is analyzed by the observation unit control section 13-2 as well as the operational instructing information is converted to the operational instruction to operate the microscope body 1. In step S7, this operational instruction is transmitted to the microscope body 1 as a command via the outer serial bus for input and output 14. Thus, in step S8, the microscope body 1 executes the processing function set by the operational switches 12a, 12b and 12c which are pressed down.

By such a flow of the processing, the operation of the microscope body 1 is carried out the functions which are allocated to the operational switches 12a, 12b and 12c. Next, an example will be explained such that a position of the revolver 3 as the function allocated to the operational switch 12a is moved by one position by using a commercial computer as the outer control device 15.

In this case, if the operational switch detecting unit 13-1 recognizes that the operational switch 12a is pressed down, the operation of the microscope body 1 is not immediately controlled in this state but the computer (the outer control device 15) is informed of the recognized content (the operational switch 12a is pressed down) via a general bus such as a RS232C or the outer serial bus for input and output 14 peculiar to the microscope system. Receiving the informed signal, the computer (the outer control device 15) stores it in the main memory 15d and the revolver rotation information from, for example, the item of the objective lens at the button No. 1 corresponding to the operational switch 12a in the function setting data shown in FIG. 8 which are registered in the storage unit 15c in advance, is identified by the calculation unit 15e. Then, this identified revolver rotation information is informed to the observation unit control unit 13-2 via the outer serial bus for input and output 14. After that, the identified revolver rotation information is converted to the operation command to the microscope body 1 in the observation unit control unit 13-2 to be transmitted to the microscope body 1 via the dedicated serial bus 39. Thus, the microscope body 1 moves the revolver 3 by one position through the frame control unit 42 in accordance with the operation command, so that the function to move the objective lens 4 by one position is realized.

Accordingly, according to the above described processing, the function setting data is referred by the outer control device 15 and a command to instruct the operation is issued. The outer control device 15 itself is capable of being remodeled and easily set out by an existing developing tool or the like, so that it is possible to rapidly cope with the changing of the GUI for creating the function setting data in response to the operator's request including extension of the functions of the function setting data and a complicated cooperative operation in response to the operator's request. Therefore, it is possible to shorten the developing time as well as improve the operability of the entire system. In other words, by writing a table shown in FIG. 8, it is possible to easily change the allocation of the operations to the operational switches.

Alternatively, referring to the function setting data by the outer control device 15 allows the functions of the operational switch detecting unit 13-1 and the observation unit control unit 13-2 to be simplified and large remodeling in the observation unit control unit 13-2 is not necessary, so that it is possible to decrease the number of the version upgrading.

Alternatively, the shape, the number and the arrangement of the operational switches 12a, 12b and 12c are not asked if the operation of any operational switch to be operated in order to act the microscope body 1 is capable of being recognized by the operational switch detecting unit 13-1.

As a modified example of the present embodiment, a whole area enclosed by dashed lines in FIG. 2 may be configured as one outer control device (computer) 150. In this case, the outer control device 150 includes a function as the operational switch detecting unit, a function as the observation unit control unit and a function as the control unit of various observation units in addition to the function for storing the table shown in FIG. 8 and allocating the operation instruction for various observation units. Additionally, in this case, a standard bus in the computer or an original bus may be used as the dedicated serial bus 39 shown in FIG. 2.

Second Embodiment

According to this second embodiment of the present invention, the functions allocated as the function setting data are capable of operating the peripheral devices. For example, in the case that the outer control device 15 comprises a computer with respect to the operational switches 12a, 12b and 12c, it is possible to turn on and off the power supply of the computer, perform the processing of a software other than a software attached to the microscope which is installed in the computer in advance and change other function setting data or the like.

This second embodiment employs the above described FIGS. 1 to 6 and 8 and the explanation of the second embodiment will be given with reference to these drawings.

Figure 9:
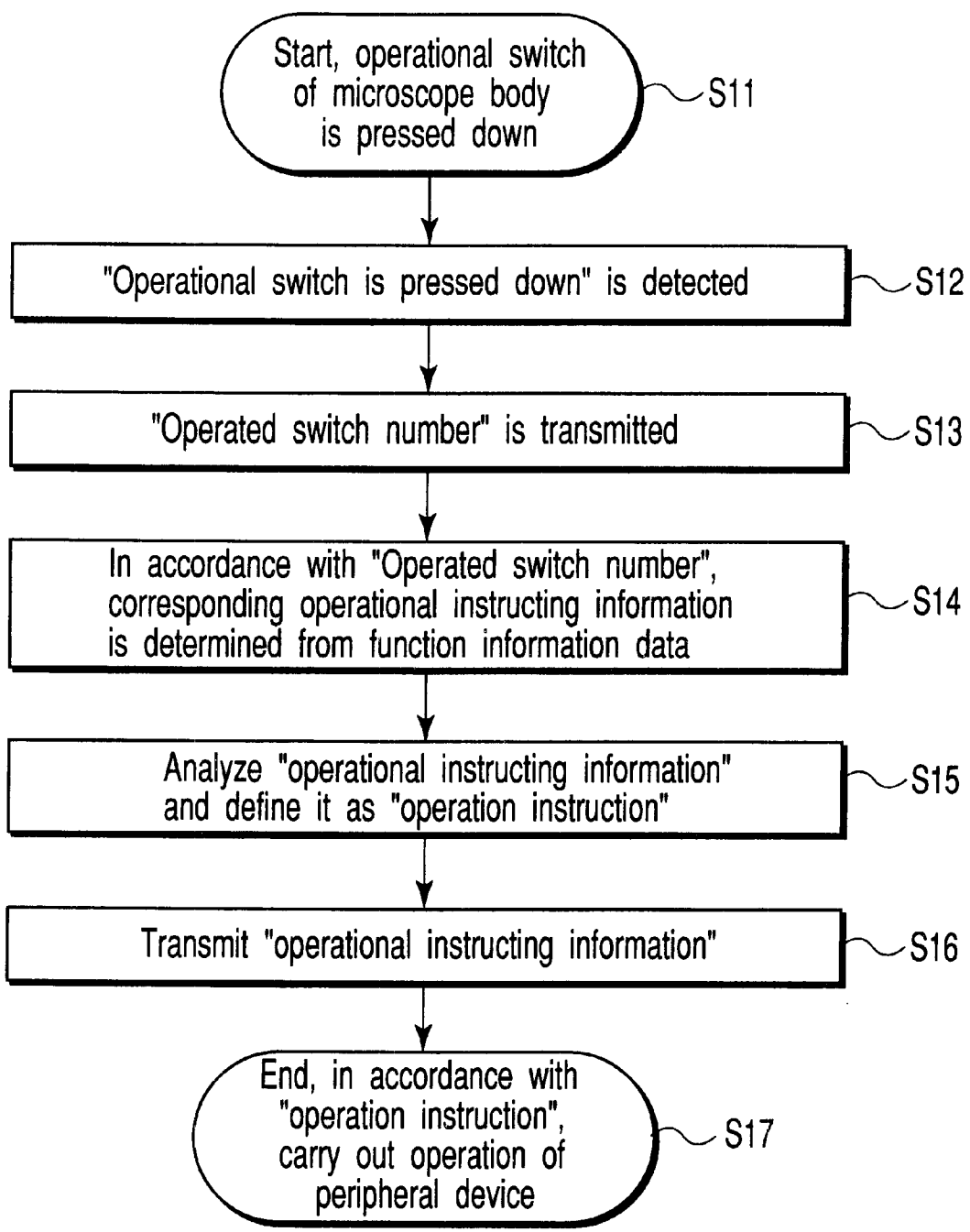
FIG. 9 is a flow chart for explaining the operation of the second embodiment of the present invention.

The processing according to the second embodiment will be performed in the following order. In this case, in a flow chart shown in FIG. 9, a start point in step S11 to step S14 for determining the operational instructing information by the outer control device 15 are the same as the processing from the step S1 to the step S4 shown in FIG. 7. Additionally, in the step S15, the operational instructing information which is determined by the calculation unit 15e of the outer control device 15 is analyzed, in step S16, the analysis result is transmitted to the target peripheral devices as the operation instruction and in step S17, the operation of the peripheral devices is carried out in accordance with the content of the operation instruction. In other words, according to this second embodiment, the transmission side and the reception side are the same outer control device 15, so that the step S5 shown in FIG. 7 is omitted.

Here, for example, a case such that the operational switch 12a realizes the function to turn off the power supply of the computer serving as the outer control device 15 will be described below.

In this case, if the operational switch detecting unit 13-1 recognizes that the operational switch 12a is pressed down, the processing is commenced and the recognized content is informed to the computer (the outer control device 15) via the outer serial bus for input and output 14. If the computer (the outer control device 15) receives the informed signal, the computer stores it in the main memory 15d. The information of turning off the power supply of the computer is identified, for example, from the item of the computer power supply of the button No. 1 corresponding to the operational switch 12a in the function setting data shown in FIG. 8 which are registered in the storage unit 15c in advance. Then, this identified information of turning off the power supply of the computer is converted to the operation instruction as the information for operating the computer by the calculation unit 15e and carries out the function of turning off the power supply of the computer (the outer control device 15).

Accordingly, the microscope body 1 enables the operation of the peripheral devices of the microscope to be realized in this way. In other words, the operator can operate the peripheral devices from the side of the microscope body 1 without operating the peripheral devices, so that the operator can turn on and off the power supply of the peripheral devices and execute the processing of the software which is installed in the outer control device, or the like. As a result, it is possible to increase the efficiency of the operation by the operator.

Figure 16:
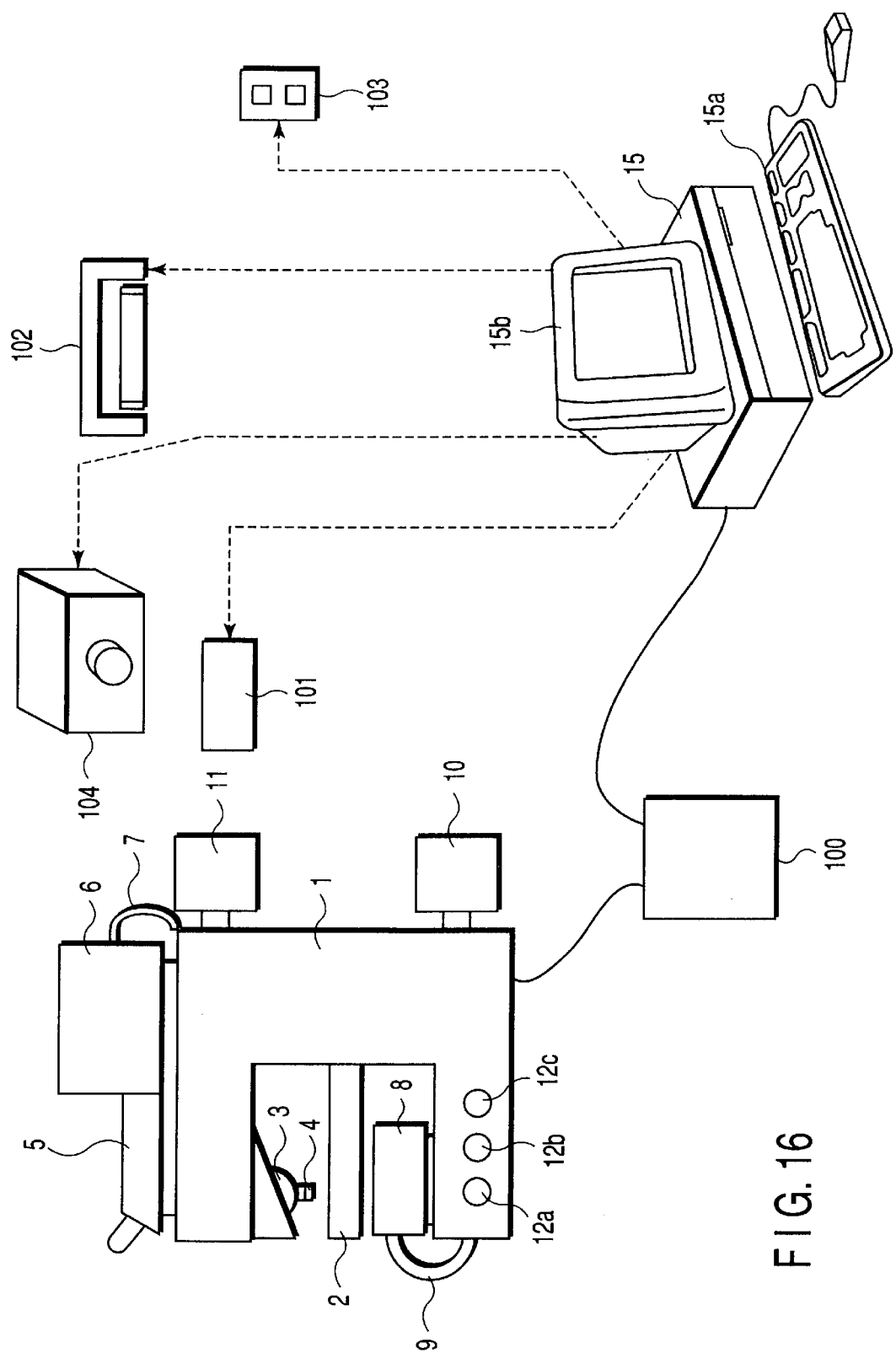
FIG. 16 illustrates a modified example of the second embodiment according to the present invention.
Figure 17:
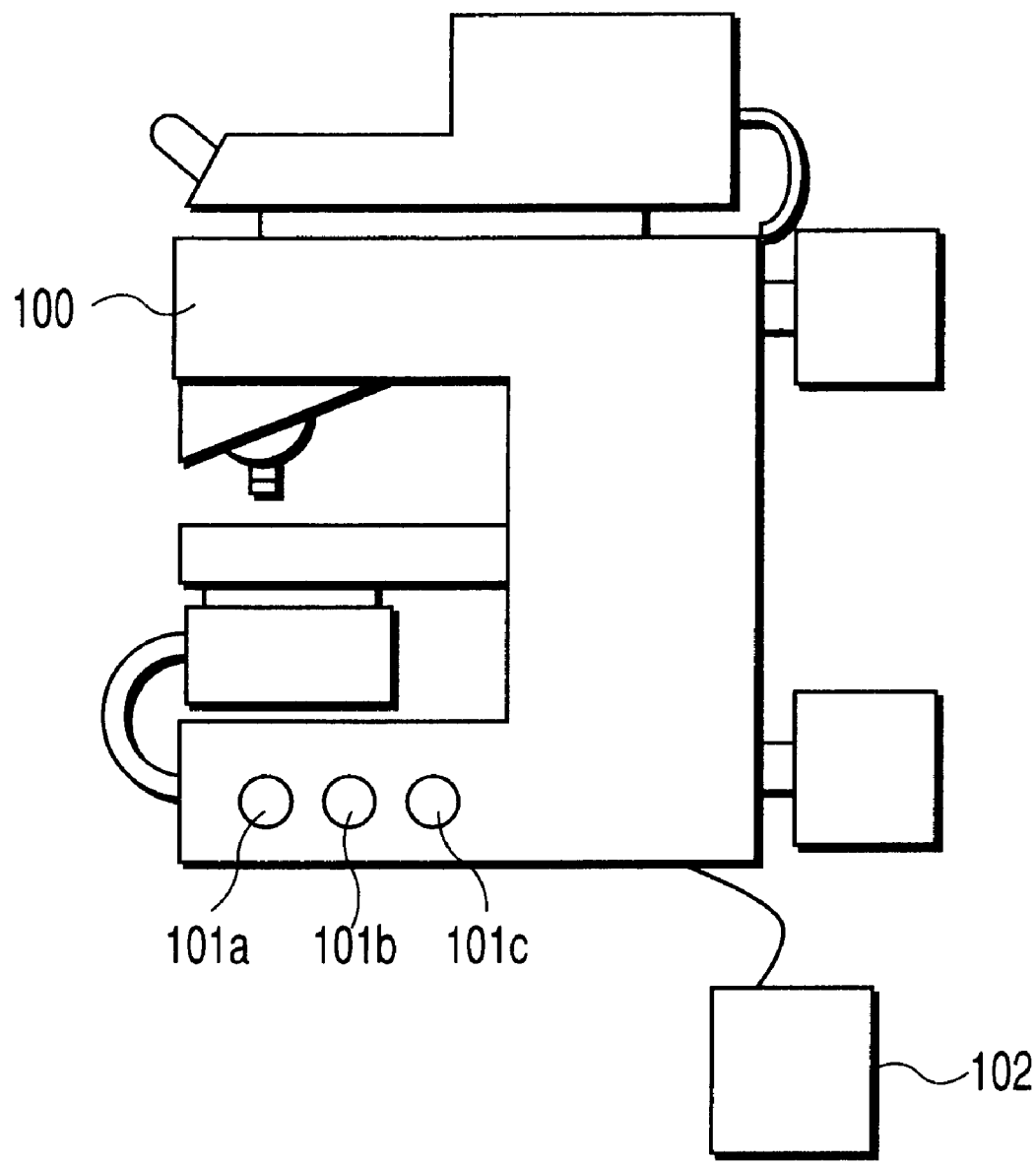
FIG. 17 illustrates a schematic structure of an example according to a conventional microscope system.

FIG. 16 illustrates a modified example of the second embodiment according to the present invention. According to this modified example, the outer control device 15 turns off the power supply of a laser light source 101, an illumination 102 and a central power supply 103 as the peripheral devices. Further, the outer control device 15 makes a digital camera 104 perform the photographic operation. If the image obtained by the digital camera 104 is transmitted to a remote place through a communication line such as Internet or the like, it is possible that a doctor can use the transmitted image at the remote place.

Third Embodiment

According to this third embodiment of the present invention, in the case of registering the continuous operation in the function setting data, as the operation instructing information from the outer control device 15, the continuous command is divided into single functions to be transmitted to the observation unit control unit 13-2. Then, this transmitted content is transmitted to the microscope body 1 as the operation instruction every when the single function is transmitted to the observation unit control unit 13-2.

Alternatively, this third embodiment of the present invention employs the above described FIGS. 1 to 6 and 8 and the explanation of the second embodiment will be given with reference to these drawings.

The processing according to the third embodiment will be performed in the following order. In this case, an example will be explained such that a position of the revolver 3 as the function allocated to the operational switch 12a is moved by one position by using a commercial computer as the outer control device 15 and the function of automatic focus is cooperatively performed.

In this case, if the operational switch detecting unit 13-1 recognizes that the operational switch 12a is pressed down, the operation of the microscope body 1 is not immediately controlled in this state but the computer (the outer control device 15) is informed of the recognized content (the operational switch 12a is pressed down) via the outer serial bus for input and output 14. Receiving the informed signal, the computer (the outer control device 15) stores it in the main memory 15d and the revolver rotation information from, for example, the item of the objective lens at the button No. 1 corresponding to the operational switch 12a in the function setting data shown in FIG. 8 which are registered in the storage unit 15c in advance, is identified by the calculation unit 15e and the automatic focus execution information from the item of the AF at the button No. 1 corresponding to the operational switch 12a in the function setting data shown in FIG. 8 which are registered in the storage unit 15c in advance, is identified by the calculation unit 15e. Then, the identified revolver rotation information and the automatic focus execution information are informed to the observation unit control unit 13-2 via the outer serial bus for input and output 14. After that, the identified revolver rotation information and the identified automatic focus execution information are converted to the operation command to the microscope body 1 in the observation unit control unit 13-2 to be transmitted to the microscope body 1 via the dedicated serial bus 39. Thus, the microscope body 1 moves the revolver 3 by one position through the frame control unit 42 in accordance with the operation command, so that the function to move the objective lens 4 by one position is realized. At the same time, by driving a AF control unit 41, the function of bringing into focus is realized by moving the sample stage on the basis of the light intensity for detecting a focus which is detected by a light receiving element for detecting a focus 32. In other words, by the operation of the operational switch 12a, the revolver 3 is moved by one position as well as the operation of the AF is realized.

Accordingly, the cooperative operation is divided into single operation instructions by the outer control device 15 to be transmitted in this way, so that even a complicated cooperative operation is capable of executing the microscope operation which is intended by the operator, by combining all single operation instructions and it is possible to increase the efficiency of the operation by the operator.

The function setting data is represented in a table format as shown in FIG. 8 in order that, for example, the relevance of the pressed down switch and its operation can be easily understood. However, a format such that the operation information are registered in order of the number in accordance with the number allocated to the buttons may be available if the computer is capable of judging the allocation of the operational switch and the operation.

Fourth Embodiment

According to the fourth embodiment, a general file format by an existing computer is employed as a saving file format of the function setting data. For example, in the case that the text file is used, even the computer, in which the software for analyzing the operation of the microscope and instructing the operation is not installed, is capable of editing the text file by the existing editor software or the like. For example, according to the function setting data shown in FIG. 8, as the function of the microscope operation, the cube setting, the objective lens setting, the on-off setting of the shutter, the filter setting, the on-off setting of the automatic focus, setting of the incident/transmissive illumination and the setting of the voltage regulation of the lamp are considered. As the operational function of the outer control device 15, on-off of the power source, the link processing of the software and the function setting data switching or the like are considered. These function setting contents are capable of being changed by the editor software. Alternatively, for example, with respect to one operational switch, the link operation in association with the button No. 1 and the single operation are capable of being set.

Therefore, the function setting data is capable of being formed in a text file format which is generally used in the computer, in the outer control device 15, so that it is possible to edit the function setting data by using the existing editor software without the outer control device 15 and the operator is capable of freely editing the function setting data even without the microscope body 1.

Fifth Embodiment

According to the present invention, the microscope system is provided with the image processing means for displaying or analyzing the observation image obtained from the microscope body.

Further, according to a microscope system having such image processing means, the control of the microscope and the image processing are related to be carried out by using a microscope image processing program on the computer.

However, upon performing a complicated processing such as the observation method of the microscope or the like by a microscope image processing program, there was a problem such that the program structure became complicated, the developing efficiency was deteriorated and extension of the function of the microscope body and the version upgrade were not easily coped with or the like.

In order to solve this problem, according to the fifth embodiment, a complicated operation such as the setting of the observation method of the microscope or the like is capable of being realized as well as the change of the operational content is capable of being flexibly coped with.

Figure 10:
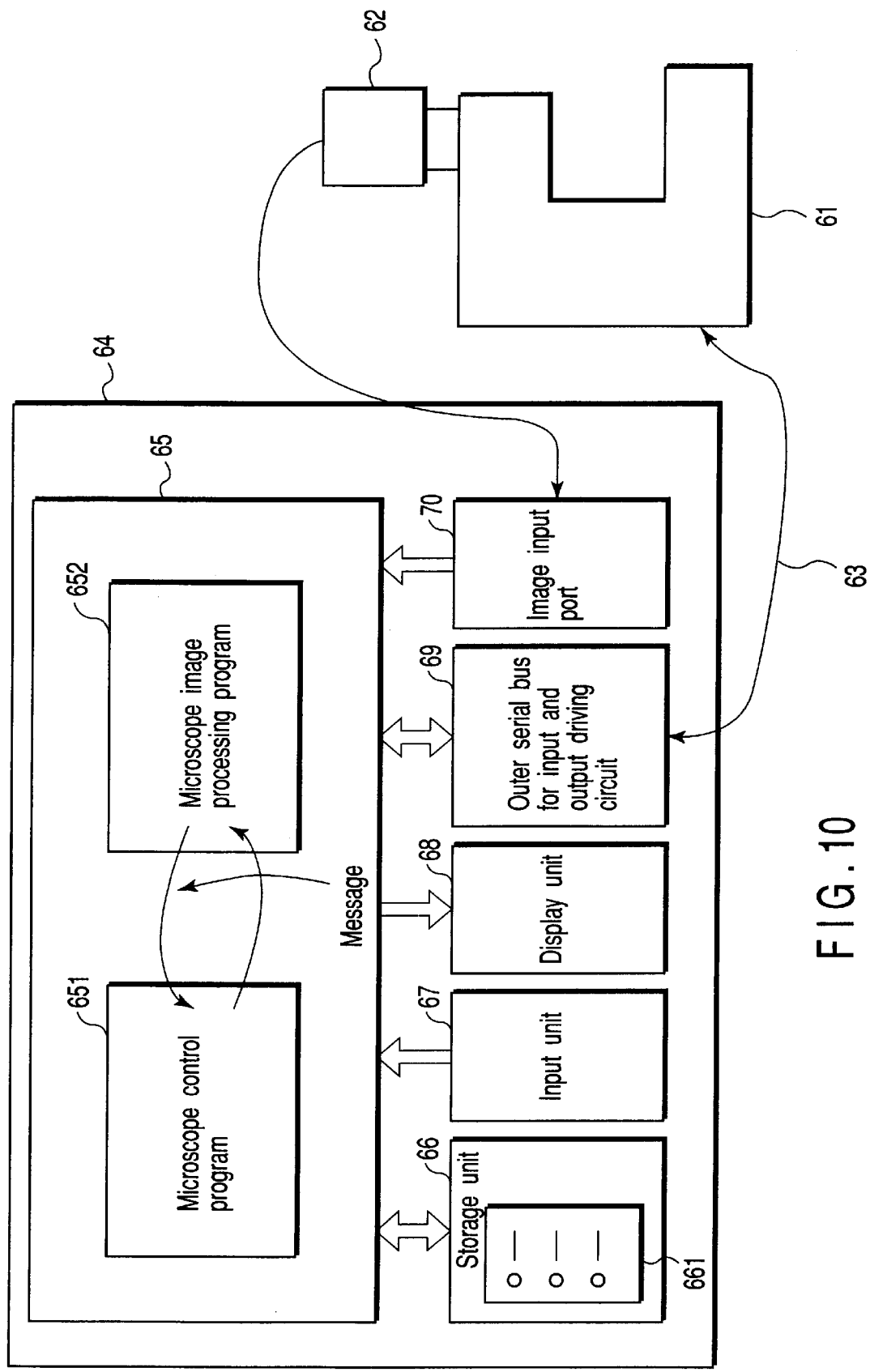
FIG. 10 illustrates a schematic structure of a microscope system according to a fifth embodiment of the present invention.

FIG. 10 illustrates a schematic structure of a microscope system according to the present invention. In FIG. 10, a reference numeral 61 denotes a microscope body. This microscope body 61 has a camera 62 as the photograph means for obtaining the observation image. Further, such a microscope body 61 is connected to an outer control device 64 such as a computer or the like via an outer serial bus for input and output 63.

Figure 15:
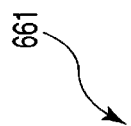
FIG. 15 illustrates a message cooperative conversion file which is used in the first embodiment of the present invention.

The outer control device 64 has a calculation unit 65 having a microscope control program 651 and a microscope image processing program 652, a storage unit 65 having a message cooperative operation converting file 661 as shown in FIG. 15, an input unit 67, a display unit 68, an outer serial bus for input and output driving circuit 69 connected to the outer serial bus for input and output 63 and an image input port 70 for taking into the observation image which is photographed by the camera 62.

Figure 11:
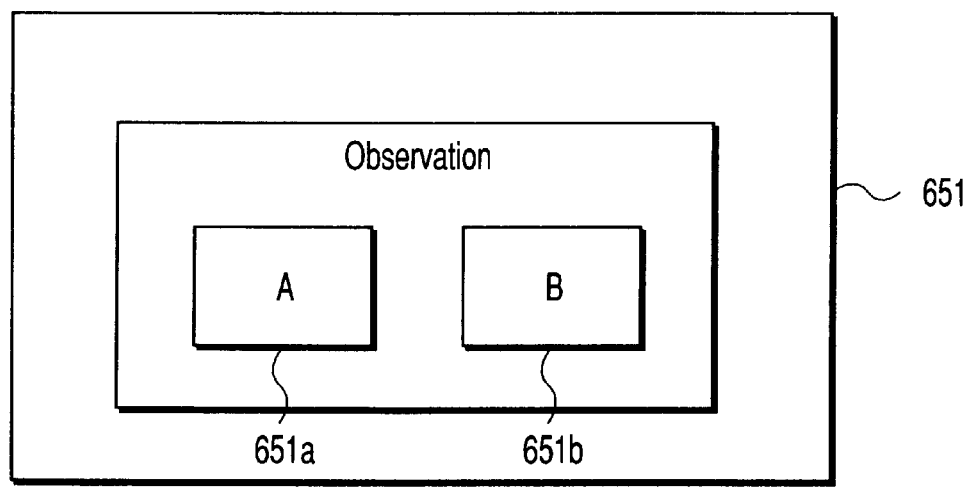
FIG. 11 illustrates a GUI of a microscope control program which is used in the fifth embodiment.

FIG. 11 illustrates an example of a GUI of a microscope control program 651. In FIG. 11, buttons 651a and 651b for switching to a microscopic inspection method of tenfold or fortyfold objective lens are displayed.

These buttons are not needed to correspond to the number of the operational switches which are actually provided in the microscope body 1, and it is possible to provide the buttons in association with the number of the functions which are registered in a table shown in FIG. 8.

Figure 12:
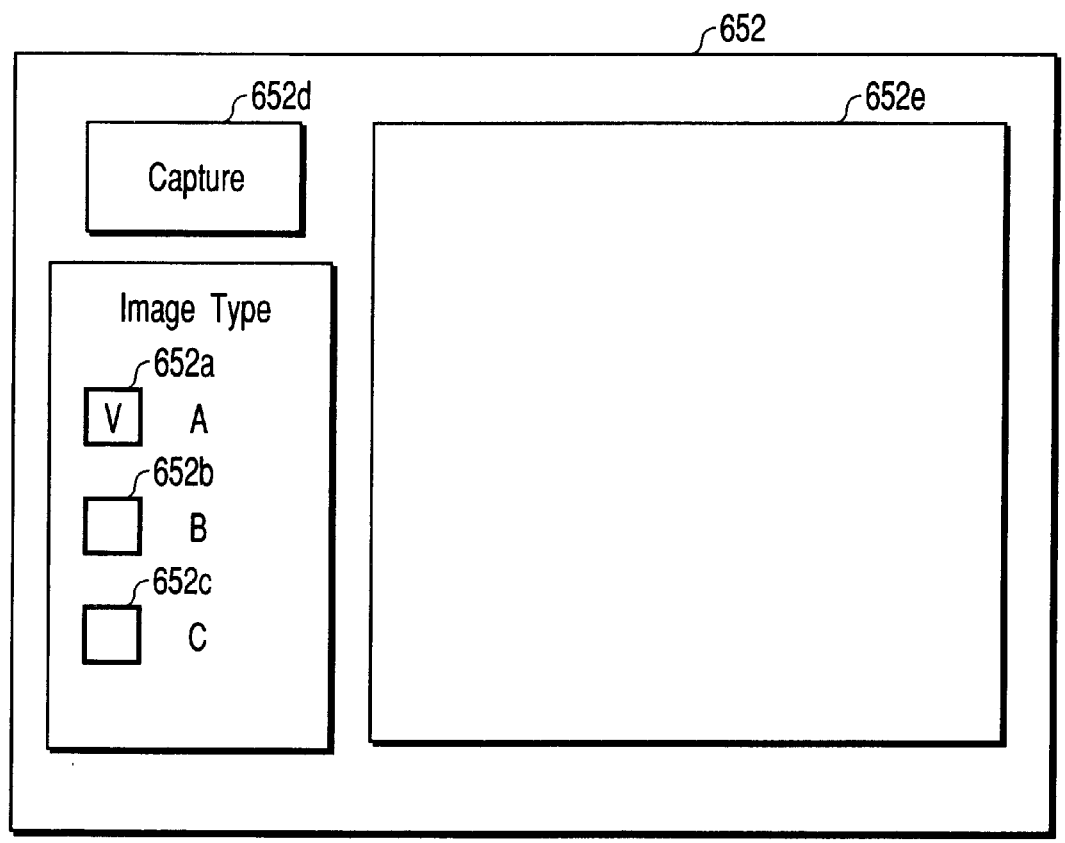
FIG. 12 illustrates a GUI of a microscope image processing program which is used in the fifth embodiment.

FIG. 12 illustrates an example of a GUI of a microscope image processing program 652. In the GUI shown in FIG. 12, buttons 652a, 652b and 652c for selecting the kinds of the images A, B and C and a button 652d for taking into the image are displayed. At the same time, the GUI in FIG. 12 has a display area 652e of the microscope image.

According to such a structure, at first, a case will be explained such that a message in association with a GUI button of the microscope control program 651 is transmitted from the microscope image processing program 652 to the microscope control program 651 and the instruction of the cooperative operation is given to the microscope body 61.

Figure 13:
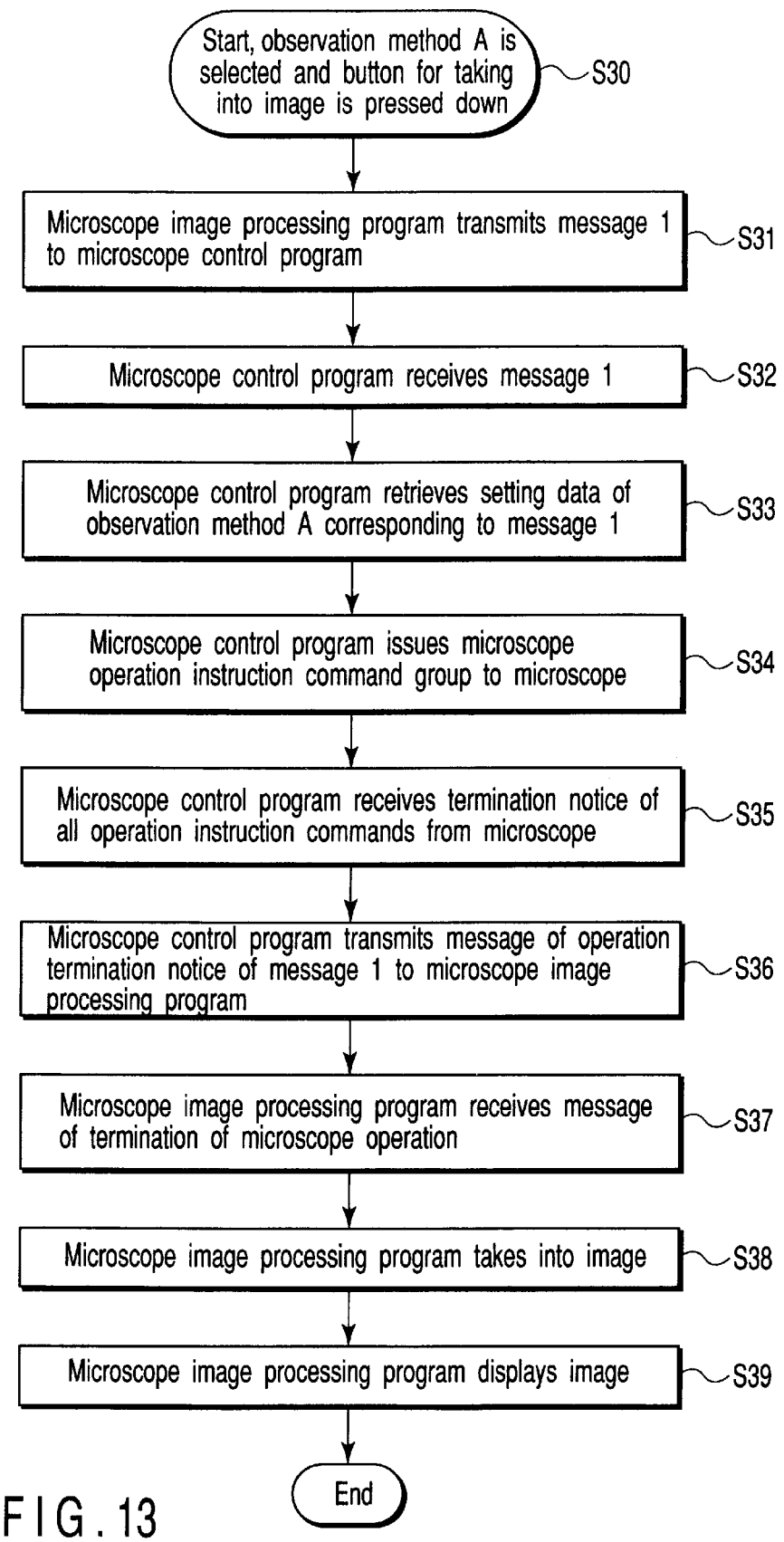
FIG. 13 is a flow chart (1) for explaining the operation of the fifth embodiment of the present invention.

In this case, a flow char in FIG. 13 will be performed. At first, in order to take into the image by an observation method A in step S30, the button 652a of Image Type is selected on the GUI of the microscope image processing program 652. Then, in step S31, the microscope image processing program 652 transmits a message of a message cooperative operation converting file 661 for selecting the button 651a to switch to the observation method A of the microscope control program 651 and a content of a message 1 in the message cooperative operation converting file 661. Further, in step S32, the microscope control program 651 receives the selection message of the button 651a, in step S33, the microscope control program 651 retrieves microscope operation instruction command group data corresponding to the message 1 in the message cooperative operation converting file 661 and in step S34, the microscope control program 651 issues a command group transmission instruction for the microscope body 61 to the outer serial bus for input and output driving circuit 69 and the command group transmission instruction is transmitted to the microscope body 61 via the outer serial bus for input and output 63.

On one hand, in step S35, if the microscope control program 651 receives a termination notice of all operation instruction commands for switching from the microscope body 61 to the observation method A, in step S36, the microscope control program 651 transmits the message of the operation termination notice of the message 1 to the microscope image processing program 652 and in step S37, the microscope image processing program 652 receives the message of the termination of the microscope operation. Therefore, in step S38, the microscope image processing program 652 takes into the image obtained by the camera 62 via the image input port 70 and in step S39, the microscope image processing program 652 displays the microscope image on the display area 652e.

In this way, it is possible to perform a complicated operation such as the setting of the observation method of the microscope or the like only by transmitting the message corresponding to the observation method without setting a complicated microscope cooperative operation. Further, it is possible that the microscope control program 651 and the microscope image processing program 652 are independently designed as a program, so that maintenance and version upgrading of these programs become easier. Therefore, it is possible to flexibly cope with the change of the specification of a microscope firm and the change by the request from the user of the image processing unit.

Next, a case will be explained such that, as a cooperative operation corresponding file, a text file is used, the text file is capable of being edited by a general text file editing software by disclosing a format in a table of the cooperative operation and it becomes possible to write the image according to an observation method peculiar to the microscope image processing program 652 by adding the switching message for switching to the observation method C which is not provided on the buttons on the GUI of the microscope control program 651, and the setting of the microscope to the cooperative operation corresponding file.

Figure 14:
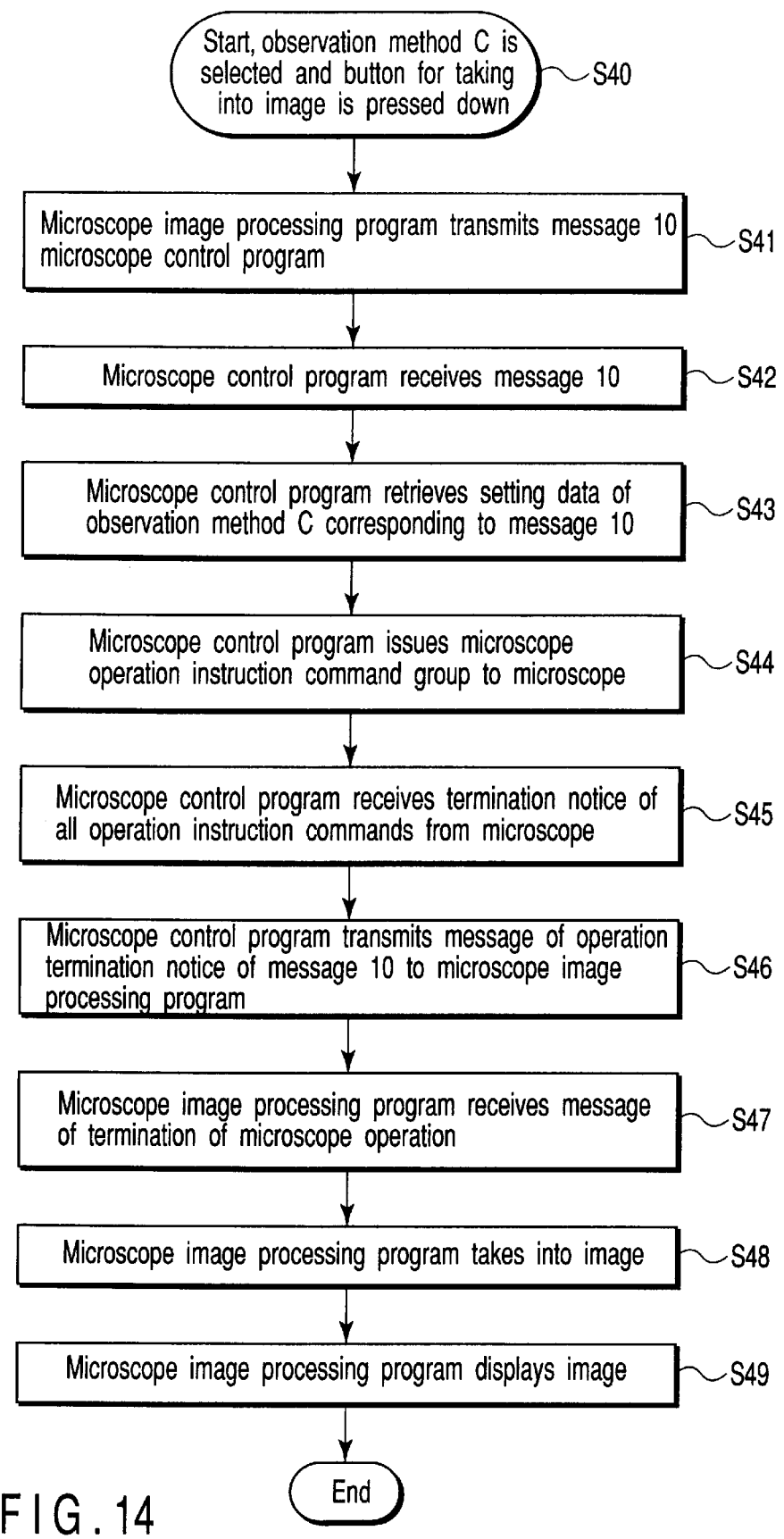
FIG. 14 is a flow chart (2) for explaining the operation of the fifth embodiment of the present invention.

In this case, a flow chart in FIG. 14 will be carried out.

At first, in step S40, a button 652c of Image Type is selected as an option on the GUI of the microscope image processing program 652 in order to take into the image by the observation method C. Then, in step S41, the microscope image processing program 652 transmits the message of the message cooperative operation converting file 661 for switching to the observation method C of the microscope control program 651 and a content of the message 10 in the message cooperative operation converting file 661. Then, in step S42, the microscope control program 651 receives the selected message of the button 652c, in step 43, the microscope control program 651 retrieves the microscope operation instruction command group data corresponding to the message 1 in the message cooperative operation converting file 661, in step S44, the microscope control program 651 issues the command group transmission command for the microscope body 61 to the outer serial bus for input and output driving circuit 69 and the issued command group transmission command is transmitted to the microscope body 61 via the outer serial bus for input and output 63.

On one hand, in step S45, if the microscope control program 651 receives a termination notice of all operation instruction commands for switching from the microscope body 61 to the observation method C, in step S46, the microscope control program 651 transmits the message of the operation termination notice of the message 10 to the microscope image processing program 652 and in step S47, the microscope image processing program 652 receives the message of the termination of the microscope operation. Therefore, in step S48, the microscope image processing program 652 takes into the image obtained by the camera 62 via the image input port 70 and in step S39, the microscope image is displayed on the display area 652e.

In this way, it is possible to apply the observation method peculiar to the microscope image processing program 652 by adding the cooperative operation instruction without the buttons corresponding to the GUI of the microscope control program 651 in the cooperative operation corresponding file. Alternatively, the cooperative operation corresponding file is a text file, so that it is also possible to easily edit the setting of the observation method desired by the user.

As described above, according to the present invention, it is possible to provide a microscope system capable of improving the operability of the system, an operation control method and an operation control program for the microscope system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
    at least one observation unit;
    a controller corresponding to said at least one observation unit;
    an operation unit for determining an operation instruction to the controller;
    a microscope body operable by the controller;
    an operation switch detecting unit for detecting an operation of the operation unit, and for providing a notification of the detected operation;
    at least one peripheral device;
    a storage unit in which first operational instructing information for said at least one observation unit and second operational instructing information for said at least one peripheral device are registered;
    an outer control device for identifying operational instructing information corresponding to a detection result from the operation switch detecting unit as one of the first and second operational instructing information, by referring to said information stored in the storage unit; and
    an observation unit control section for converting the operational instructing information which is identified as the first operational instructing information by the outer control device into operation instructing commands to the observation unit, and for giving the operation instructing commands to the controller;
    wherein the observation unit refers to the storage unit after receiving the detection result from the operation switch detecting unit, identifies the operational instructing information corresponding to the detection result as the second operational instructing information, and controls said at least one peripheral device by utilizing the observation unit control section.

2. A microscope system according to claim 1, wherein the observation unit control section is provided in the microscope body.

3. A microscope system according to claim 1, wherein the observation unit control section is not provided in the microscope body.

4. A microscope system comprising:
    at least one observation unit;
    at least one photographing unit;
    a microscope control unit for giving operation instructions to said at least one observation unit and said at least one photographing unit;
    a microscope main body operable by the microscope control unit;
    a microscope image processing unit for displaying or analyzing a microscope image which is obtained by said at least one photographing unit;
    an operational instructing information registering unit for registering operational instructing information for the microscope main body; and
    a control unit for receiving a message from the microscope image processing unit, for reading out from the operational instructing information registering unit operational instructing information respectively corresponding to the operation instructions given by the microscope control unit, and for controlling the operation instructions to said at least one observation unit and said at least one photographing unit on operation;
    wherein the microscope control unit refers to the operational instructing information registering unit, obtains operational instructing information corresponding to the message from the microscope image processing unit by identifying the operational instructing information corresponding to the message as operational instructing information to said at least one observation unit and operational instructing information to said at least one photographing unit, and gives the respective operational instructing information to said at least one observation unit and said at least one photographing unit, respectively.

5. An operation control method for a microscope system which comprises at least one observation unit, a controller corresponding to said at least one observation unit, an operation unit for determining an operation instruction to the controller, a microscope body operable by the controller, an operation switch detecting unit for detecting an operation of the operation unit and for providing a notification of the detected operation, at least one peripheral device, a storage unit in which first operational instructing information for said at least one observation unit and second operational instructing information for said at least one peripheral device are registered, an outer control device, and an observation unit control section, said method comprising:

utilizing the outer control device to identify operational instructing information corresponding to a detection result from the operation switch detecting unit as one of the first and second operational instructing information, by referring to said information stored in the storage unit; and utilizing the observation unit control section to convert the operational instructing information which is identified as the first operational instructing information by the outer control device into operation instructing commands to the observation unit, and to give the operation instructing commands to the controller;

wherein the observation unit refers to the storage unit after receiving the detection result from the operation switch detecting unit, identifies the operational instructing information corresponding to the detection result as the second operational instructing information, and controls said at least one peripheral device by utilizing the observation unit control section.

6. An operation control method for a microscope system which comprises at least one observation unit, at least one photographing unit, a microscope control unit for giving operation instructions to said at least one observation unit and said at least one photographing unit, a microscope main body operable by the microscope control unit, a microscope image processing unit for displaying or analyzing a microscope image which is obtained by said at least one photographing unit, an operational instructing information registering unit for registering operational instructing information for the microscope main body, and a control unit, said method comprising:

utilizing the control unit to receive a message from the microscope image processing unit, to read out operational instructing information respectively corresponding to the operation instructions given by the microscope control unit, from the operational instructing information registering unit, and to control the operation instructions to said at least one observation unit and said at least one photographing unit on operation;

wherein the microscope control unit refers to the operational instructing information registering unit, obtains operational instructing information corresponding to a message from the microscope image processing unit by identifying the operational instructing information corresponding to the message as operational instructing information to said at least one observation unit and operational instructing information to said at least one photographing unit, and gives the operational instructing information to said at least one observation unit and the operational instructing information to said at least one photographing unit to said at least one observation unit and said at least one photographing unit, respectively.

7. An operation control program for a microscope system which comprises at least one observation unit, a controller corresponding to said at least one observation unit, an operation unit for determining an operation instruction to the controller, a microscope body operable by the controller, an operation switch detecting unit for detecting an operation of the operation unit and for providing a notification of the detected operation, at least one peripheral device, a storage unit in which first operational instructing information for said at least one observation unit and second operational instructing information for said at least one peripheral device are registered, an outer control device, and an observation unit control section, said operation control program comprising:

code for utilizing the outer control device to identify operational instructing information corresponding to a detection result from the operation switch detecting unit as one of the first and second operational instructing information, by referring to said information stored in the storage unit; and code for utilizing the observation unit control section to convert the operational instructing information which is identified as the first operational instructing information by the outer control device into operation instructing commands to the observation unit, and to give the operation instructing commands to the controller;

wherein the observation unit refers to the storage unit after receiving the detection result from the operation switch detecting unit, identifies the operational instructing information corresponding to the detection result as the second operational instructing information, and controls said at least one peripheral device by utilizing the observation unit control section.

8. An operation control program for a microscope system which comprises at least one observation unit, at least one photographing unit, a microscope control unit for giving operation instructions to said at least one observation unit and said at least one photographing unit, a microscope main body operable by the microscope control unit, a microscope image processing unit for displaying or analyzing a microscope image which is obtained by said at least one photographing unit, an operational instructing information registering unit for registering operational instructing information for the microscope main body, and a control unit, said operation control program comprising:

code for utilizing the control unit to receive a message from the microscope image processing unit, to read out operational instructing information respectively corresponding to the operation instructions given by the microscope control unit, from the operational instructing information registering unit, and to control the operation instructions to said at least one observation unit and said at least one photographing unit on operation;

wherein the microscope control unit refers to the operational instructing information registering unit, obtains operational instructing information corresponding to a message from the microscope image processing unit by identifying the operational instructing information corresponding to the message as operational instructing information to said at least one observation unit and operational instructing information to said at least one photographing unit, and gives the operational instructing information to said at least one observation unit and the operational instructing information to said at least one photographing unit to said at least one observation unit and said at least one photographing unit, respectively.

* * * * *